United States Patent
Dilzer

(10) Patent No.: US 7,625,311 B2
(45) Date of Patent: Dec. 1, 2009

(54) METHOD FOR THE OPERATION OF A HYBRID DRIVE TRAIN IN A MOTOR VEHICLE

(75) Inventor: Martin Dilzer, Buehl (DE)

(73) Assignee: Luk Lamellen und Kupplungsbau Beteilgungs KG, Buehl (DE)

( * ) Notice: Subject to any disclaimer, the term of this patent is extended or adjusted under 35 U.S.C. 154(b) by 0 days.

(21) Appl. No.: 12/403,471

(22) Filed: Mar. 13, 2009

(65) Prior Publication Data

US 2009/0176617 A1 Jul. 9, 2009

Related U.S. Application Data

(63) Continuation of application No. PCT/DE2007/001475, filed on Aug. 20, 2007.

(30) Foreign Application Priority Data

Sep. 15, 2006 (DE) .................. 10 2006 043 329

(51) Int. Cl.
- *B60W 10/08* (2006.01)
- *B60W 10/02* (2006.01)
- *B60W 10/04* (2006.01)
- *H02P 15/00* (2006.01)

(52) U.S. Cl. .................. 477/5; 477/6; 477/8; 74/331; 903/946

(58) Field of Classification Search .............. 477/5, 477/6, 8; 74/331; 903/945, 946
See application file for complete search history.

(56) References Cited

U.S. PATENT DOCUMENTS

| | | | |
|---|---|---|---|
| 6,506,139 B2 * | 1/2003 | Hirt et al. | 477/3 |
| 6,966,868 B2 * | 11/2005 | Stork et al. | 477/74 |
| 7,094,176 B2 * | 8/2006 | Budal et al. | 477/5 |
| 7,166,059 B2 * | 1/2007 | Reitz et al. | 477/5 |
| 2005/0139035 A1 | 6/2005 | Lee et al. | |

FOREIGN PATENT DOCUMENTS

| | | |
|---|---|---|
| DE | 103 08 697 | 9/2003 |
| DE | 103 05 639 A | 3/2004 |
| EP | 1 559 603 | 8/2005 |
| JP | 2005147312 A * | 6/2005 |

* cited by examiner

*Primary Examiner*—Tisha D Lewis
(74) *Attorney, Agent, or Firm*—Lucas & Mercanti, LLP

(57) ABSTRACT

The hybrid drive train has an internal combustion engine connected to a first input shaft via a first clutch and connected to a second input shaft via a second clutch. An electric machine is connected to the second input shaft. The first input shaft is coupled to an output shaft via a first gear, and the second input shaft is coupled to the output shaft via two second gears. In the method for operating the hybrid, the first gear is engaged and torque is applied by the engine. To change, one of the second gears is engaged, engine torque is reduced by slipping the clutch while electric machine torque is increased. To change again, electric machine torque is reduced to zero, the other second gear is engaged while engine torque transmitted via the first clutch is increased by reducing slipping of the first clutch.

4 Claims, 2 Drawing Sheets

METHOD FOR THE OPERATION OF A HYBRID DRIVE TRAIN IN A MOTOR VEHICLE

This application is a continuation application of PCT/DE2007/001475 filed Aug. 20, 2007, which in turn claims the priority of DE 10 2006 043 329.7 filed Sep. 15, 2006, the priority of both applications is hereby claimed and both applications are incorporated by reference herein.

BACKGROUND OF THE INVENTION

The invention relates to a method for operating a hybrid drive train for a motor vehicle, wherein the hybrid drive train comprises an internal combustion engine and an electric motor as drive units, and wherein a parallel variable speed transmission with a first transmission input shaft, a second transmission input shaft and a transmission output shaft is disposed in the hybrid drive train, wherein the first transmission input shaft can be coupled to the transmission output shaft through at least a first gear and the second transmission input shaft can be coupled to the transmission output shaft by at least a second gear, wherein the internal combustion engine can be brought into operative engagement with the first transmission input shaft through a first clutch and can be brought into operative engagement with the second transmission input shaft through a second clutch, and wherein the electric motor is drivingly engaged with the second transmission input shaft.

Such a method is known from the book "7.LuK Colloquium 11./12. April 2002", editor: LuK GmbH & Co., pages 252-254. Thus, for accelerating the motor vehicle from a stop, initially the gear "1" is shifted at the first transmission input shaft with the first and second clutch open, and the gear "2" is preselected at the second transmission input shaft. Then, the first clutch is closed, in order to transfer torque from the internal combustion engine to the drive wheels of the motor vehicle. Additionally, the drive wheels are driven by the electric motor through the second transmission input shaft and through the preselected gear "2" (boost function).

Alternatively, the gear "1" can be shifted at the first transmission input shaft with the first clutch open, and the gears of the second transmission input shaft can be shifted into neutral position. Then, the first and the second clutch are closed, in order to transfer a respective torque to the drive wheels of the motor vehicle by means of the internal combustion engine and the electric motor. The force flow from the electric motor thus runs through the second transmission input shaft, the second clutch, the input shaft of the combustion engine, the first clutch, the first transmission input shaft and the gear "1" to the transmission output shaft. Preselecting a gear on the second input shaft is performed with this shifting strategy while driving.

After the motor vehicle has reached a predetermined first speed, the internal combustion engine is shifted from first gear to the gear "2". For this purpose, the second clutch is closed, while the first clutch is simultaneously opened and the motor vehicle continues to be driven by the electric motor, too.

Now gear "3" is preselected at the first transmission input shaft. After the motor vehicle has reached a predetermined second speed, the internal combustion engine is shifted from gear "2" to gear "3". For this purpose, the first clutch is closed, while the second clutch is simultaneously opened and the motor vehicle continues to also be driven by the electric motor through the gear "2", which is still shifted.

Now the gear "4" is preselected at the second transmission input shaft, while the second clutch continues to be open. Thus, initially the torque of the electric motor is reduced to zero. Subsequently, the gear "2" is brought into neutral position and then the gear "4" is shifted. Thereafter, torque is generated again by the electric motor and transferred through the preselected gear "4" to the drive wheels of the motor vehicle.

After the motor vehicle has reached a predetermined third speed, the internal combustion engine is shifted from gear "3" to gear "4". For this purpose, the second clutch is closed, while the first clutch is simultaneously opened, and the motor vehicle continues to be also driven by the electric motor. When the motor vehicle is accelerated further, the shifting from the gear "4" into the gear "5" and from there into the gear "6" is performed in the same manner.

The method has the disadvantage that during a gear change on the second transmission input shaft, thus when shifting from gear "2" to gear "4", and from gear "4" to gear "6", no torque can be transferred from the electric motor to the drive wheels, since the partial transmission formed by the second gears is in neutral position for the moment. The loss of propulsion associated therewith is perceived as detrimental by the users of the motor vehicle.

SUMMARY OF THE INVENTION

Thus, it is the object of the invention to provide a method as described supra, which avoids a loss of propulsion force when shifting a second gear with the electric motor previously engaged for propulsion.

This object is accomplished through a method for operating a hybrid drive train for a motor vehicle, wherein the hybrid drive train comprises an internal combustion engine and an electric motor as drive systems, and wherein a parallel variable speed transmission is disposed in the hybrid drive train, comprising: a first transmission input shaft, a second transmission input shaft and a transmission output shaft, wherein the first transmission input shaft can be coupled to the transmission output shaft through at least one first gear, and the second transmission input shaft can be coupled to the transmission output shaft through at least two second gears, wherein the combustion engine can be brought into operative engagement with the first transmission input shaft through a first clutch, and can be brought into operative engagement with the second transmission input shaft through a second clutch, and wherein the electric motor is in driving engagement with the second transmission input shaft, wherein a first gear is shifted and torque is applied by the internal combustion engine through the first clutch to the first transmission input shaft, wherein a first second gear is shifted with the second clutch open and torque is applied by the electrical motor to the transmission output shaft through the first transmission input shaft and the first second gear, wherein clutch slippage is created at the first clutch by reducing the torque transferred by the first clutch, while the torque provided by the electric motor is increased, wherein subsequently the torque provided by the electric motor is substantially reduced to zero, and a second, second gear is shifted, while the slippage at the first clutch is reduced by increasing the torque transferred through the first clutch, and wherein subsequently by means of the electrical motor torque is transferred to the transmission output shaft through the first transmission input shaft and the second, second gear.

Before the gear change is begun, thus the torque transferred through the first clutch is reduced through partial opening of the first clutch. Thus, the speed of the internal combustion engine is slightly increased, so that additional kinetic energy is stored in the internal combustion engine. The reduction of the total torque transferred to the transmission output shaft through the first clutch is compensated by a respective increase of the torque of the electric motor. Thus, the acceleration of the motor vehicle can be kept approximately constant in spite of the reduced clutch moment of the first clutch. As soon as a sufficient slippage reserve exists, the torque of the electric motor is reduced to zero. The reduction is compensated by a respective increase of the torque transferred by the first clutch. Thus, the slippage at the first clutch is reduced. Thus, the acceleration of the motor vehicle can be kept constant instead of the lacking drive torque of the electric motor. After the second gear has been shifted and synchronized, torque is transferred again by the electric motor to the transmission output shaft. The torque transferred through the first clutch and possibly through the second clutch from the internal combustion engine to the transmission output shaft is reduced accordingly. Thus, the full acceleration force is maintained in boost operation of the hybrid drive train during the shifting process without interruption.

The object described above is furthermore accomplished by a method for operating a hybrid drive train for a motor vehicle, wherein the hybrid drive train comprises an internal combustion engine and an electric motor as drive systems, and wherein a parallel variable speed transmission with a first transmission input shaft, a second transmission input shaft and a transmission output shaft is disposed in the hybrid drive train, wherein the first transmission input shaft can be coupled to the transmission output shaft through at least one first gear, and the second transmission input shaft can be coupled to the transmission output shaft through at least one second gear, wherein the combustion engine can be brought into operative engagement with the first transmission input shaft through a first clutch and can be brought into operative engagement with the second transmission input shaft through a second clutch, and wherein the electric motor is in driving engagement with the second transmission input shaft, wherein a first gear is shifted and torque is applied to the first transmission input shaft by the internal combustion engine through the first clutch, wherein a torque is applied to the first transmission input shaft by the electric motor through the second transmission input shaft, the second clutch and the first clutch with the at least one second gear in neutral position, wherein clutch slippage is established at the first clutch, while the torque provided by the electric motor is increased, wherein clutch slippage is established at the first clutch by increasing the torque provided by the electric motor, wherein subsequently the slippage at the first clutch is reduced by reducing the torque applied by the electric motor, the second clutch is opened and a second gear is shifted, and wherein torque is transferred to the transmission output shaft by the electric motor through the first transmission input shaft and the second gear.

The torque generated by the electric motor can also be transmitted through the second clutch onto the combustion engine and from there through the first clutch onto the first transmission input shaft and the transmission output shaft. Also in this solution, slippage is established at the first clutch before shifting gears by increasing the torque generated by the electric motor. As soon as sufficient slippage reserve exists, the torque of the electric motor is reduced, so that the slippage at the first clutch is reduced. After the second gear has been shifted and synchronized, torque is transmitted again to the transmission output shaft by the electric motor. Thus, also with this solution, the full propulsion force is maintained during the shifting process without interruption.

It is advantageous, when the torque of the electric motor is adapted to the clutch slippage of the first clutch, so that torque transmitted through the first clutch is maintained approximately constant while the clutch slippage is build-up. The motor vehicle can then be accelerated in an even smoother manner.

The slippage of the first clutch is preferably reduced, so that the torque transmitted to the transmission output shaft remains approximately constant from the beginning of the reduction of the torque applied by the electric motor until the end of the closing process of the second clutch. Also, by this measure, a smooth acceleration of the motor vehicle is facilitated during the shifting process.

It is advantageous when the torque of the electric motor is increased or reduced in a ramp profile. The slippage in the first clutch can then be increased and decreased smoothly.

BRIEF DESCRIPTION OF THE DRAWINGS

Subsequently, an embodiment of the invention is described in more detail with reference to the drawing figure, wherein.

DETAILED DESCRIPTION OF THE INVENTION

Figure 1:
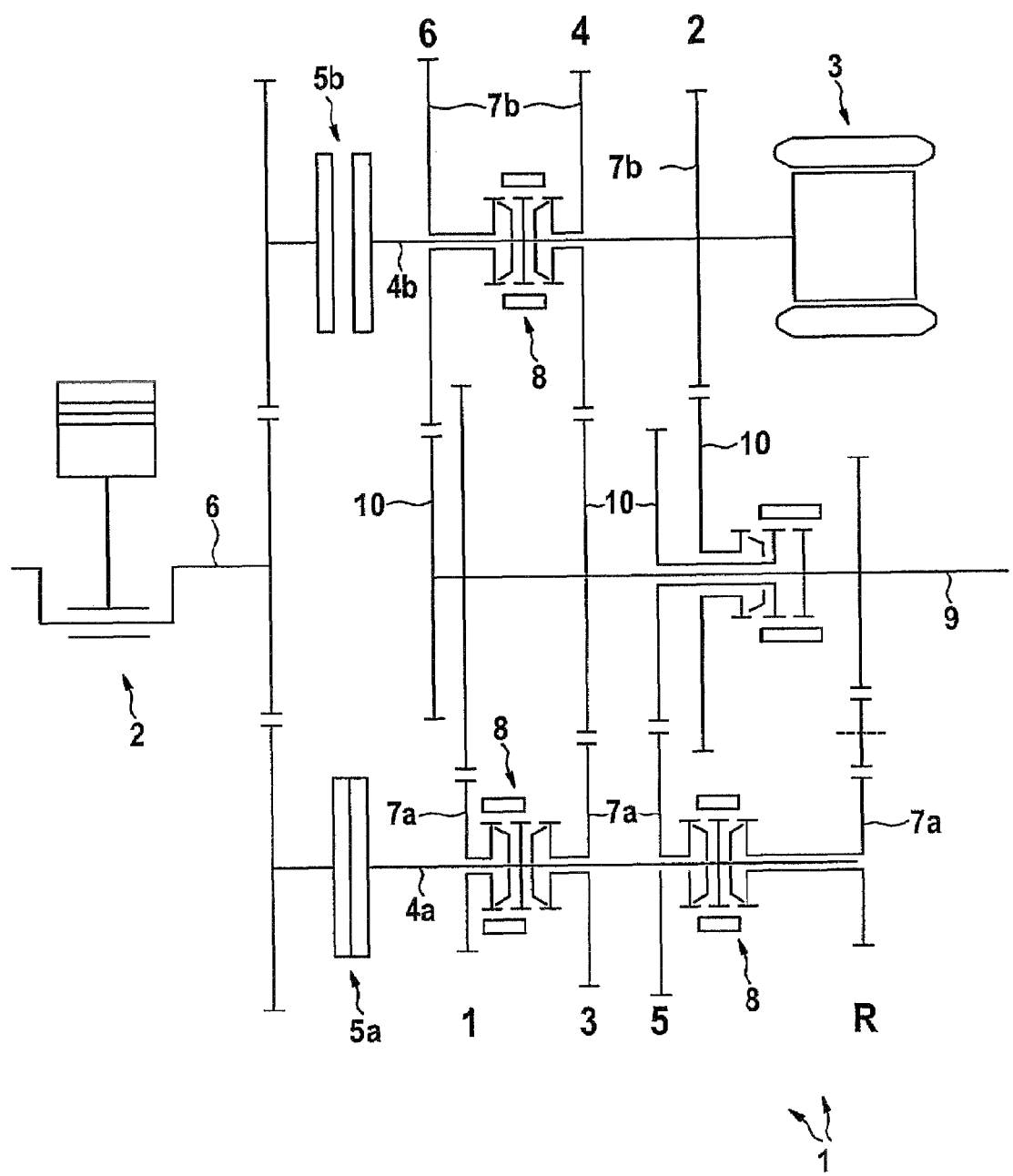
FIG. 1 shows a schematic illustration of a hybrid drive train of a motor vehicle.

A hybrid drive train designated as 1 in FIG. 1 for a motor vehicle comprises an internal combustion engine 2 and an electric motor 3 as drive units, which are connected to the drive wheels of the motor vehicle, which are not shown in detail in the drawing, through a parallel variable speed transmission.

The parallel variable speed transmission comprises a first transmission input shaft 4a, which can be connected through a first clutch 5a with a drive shaft 6, like e.g. the crank shaft of the internal combustion engine 2. A second transmission input shaft 4b of the parallel variable speed transmission can be connected to the drive shaft 6 through a second clutch 5b. The electric motor 3 is furthermore in driving engagement with the second transmission input shaft 4b. The electric motor 3 can be disposed coaxial to the second transmission input shaft 4b, or it can be spaced laterally from it and it can be connected through a chain or through a similar transmission means to the second transmission input shaft 4b.

The first uneven gears 1, 3 and 5 and the reverse gear are associated with the first transmission input shaft 4a. Each of said gears has a respective transmission gear 7a, which can be connected torque proof to the first transmission input shaft 4a by means of the synchronization device 8, and can be disconnected again there from. The transmission gears 7a of the gears 1, 3 and 5 respectively mesh with a complementary gear 10, connected torque proof with a transmission output shaft 9.

The second even gears 2, 4 and 6 are associated with the second transmission input shaft 4b. Each of said gears respectively comprises a transmission gear 7a, which can be connected torque proof with the first transmission input shaft 4a by means of a synchronization device 8, and can be disconnected again from said transmission input shaft. The transmission gears 7b of the gears 1, 3 and 5 respectively mesh with a complementary gear 10, connected torque proof with a transmission output shaft 9.

In a first shifting strategy, initially both clutches 5a, 5b are opened for accelerating the vehicle from a stop. At the first transmission input shaft 4a, the gear "1" is shifted and at the second transmission input shaft 4b, the gear "2" is preselected. Then the first clutch 5a is closed in order to transfer torque to the first transmission input shaft 4a by means of the internal combustion engine 2 and from said first transmission input shaft through the gear "1" to the transmission output shaft 9. Additionally, torque is generated by means of the electric motor 3 and transmitted through the second transmission input shaft 4b and the preselected gear "2" to the transmission output shaft 9 (boost function).

After the motor vehicle has reached a predetermined first speed, the internal combustion engine 2 is shifted from gear "1" to gear "2". For this purpose, the second clutch 5b is closed, while the first clutch 5a is simultaneously opened and the motor vehicle continues to be also driven by the electric motor.

Now the gear "3" is preselected at the first transmission input shaft 4a. After the motor vehicle has reached a predetermined second speed, the internal combustion engine 2 is shifted from gear "2" to gear "3". For this purpose, the first clutch 5a is closed, while the second clutch 5b is opened simultaneously and the motor vehicle continues to be also driven by the electric motor 3 through the gear "2", which is still shifted.

Figure 2:
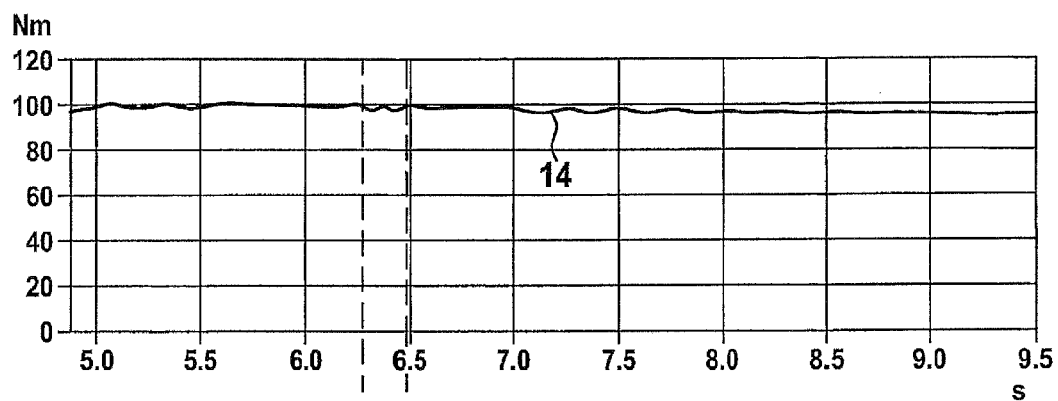
FIG. 2 shows a graphic illustration of the total torque transmitted through a transmission output shaft, wherein the time in seconds is drawn up along the x-coordinate, and the torque in Nm is drawn up along the y-coordinate.
Figure 3:
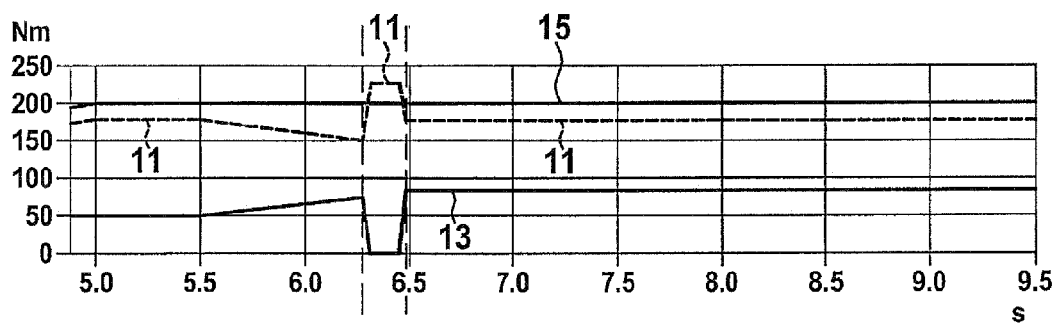
FIG. 3 shows a graphic illustration of the torque generated by an internal combustion engine (upper curve), of the torque transmitted through a first clutch (center curve), and of the torque generated by the electric motor (lower curve), wherein the time in seconds is drawn up on the x-coordinate, and the torque in Nm is drawn up along the y-coordinate.
Figure 4:
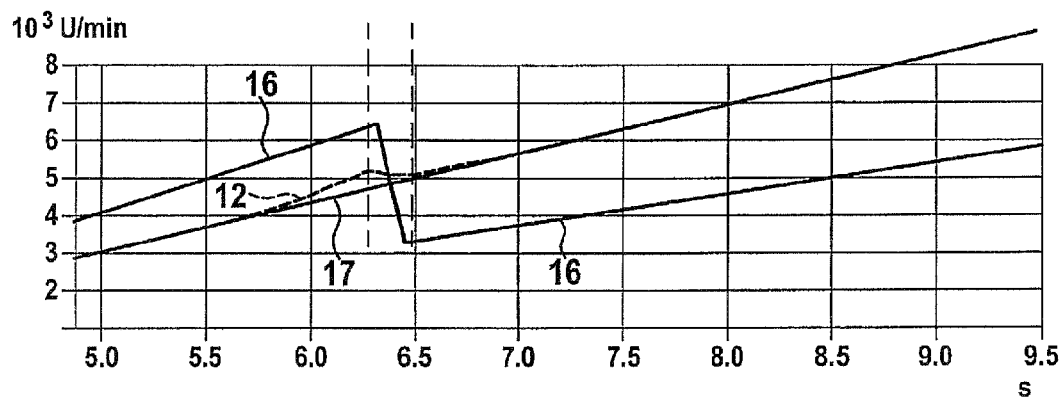
FIG. 4 shows a graphic illustration of the speeds of a combustion engine and of two transmission input shafts, wherein the time in seconds is drawn up on the x-coordinate, and the speed in 1000 RPM is drawn up on the y-coordinate.

As soon as the motor vehicle has reached a predetermined third speed, the first clutch 5a is opened slightly, in order to generate slippage and to reduce the torque 11 transferred through the first clutch 5a. It is evident in FIG. 3 that the speed 12 of the internal combustion engine 2 slightly increases through the torque reduction. Simultaneously, the torque 13 generated by the electric motor 3 is increased accordingly, so that the total torque 14 transferred to the transmission output shaft remains approximately constant (re. FIGS. 2-4). The torque of the internal combustion engine is designated as 15 in FIG. 3.

After a sufficient slippage is established, the torque 13 imparted by the electric motor 3 is ramped down and the torque 11 transferred through the first clutch 5a is increased simultaneously, so that the slippage at the first clutch 5a is reduced. It is evident in FIG. 4 that the speed 12 of the internal combustion engine 2 increases slightly. After the torque 12 of the electric motor is reduced to a value close to zero, the gear "4" is preselected at the second transmission input shaft 4b and synchronized. Thus, the speed 16 of the second transmission input shaft 4b decreases. Thereafter, torque 13 is generated again by the electric motor 3 and transferred to the transmission output shaft 9 through the second transmission input shaft 4b and the preselected gear "4". The torque 13 of the electric motor 3 is ramped up, while the torque 11 transferred through the first clutch 5a is simultaneously reduced by opening the first clutch 5a, so that the total torque 14 transmitted to the transmission output shaft 9 remains approximately constant. The speed of the first transmission input shaft 4a is designated as 17 in FIG. 4.

As soon as the motor vehicle has reached a predetermined fourth velocity, the first clutch 5a is opened, and the second clutch 5b is closed, so that the internal combustion engine 2 then drives the transmission output shaft 9 through the second clutch 5b, the second transmission input shaft 4b and the gear "4".

In a second shifting strategy, initially both clutches 5a, 5b are opened for accelerating the motor vehicle from a stop. The gear "1" is shifted on the first transmission input shaft 4a and the gears "2", "4" and "6" of the second transmission input shaft 4b are brought into neutral position. Then the first clutch 5a and the second clutch 5b are closed, in order to transfer respective torque to the drive wheels of the motor vehicle by means of the internal combustion engine 2 and by means of the electric motor 3. The force flow of the electric motor 3 thus runs through the second transmission input shaft 4b, the second clutch 5b, the drive shaft 6 of the internal combustion engine 2, the first clutch 5a, the first transmission input shaft 4a and the gear "1" to the transmission output shaft 9. While driving, the torque of the electric motor 3 is reduced to zero, the second clutch 5b is opened, in order to subsequently preselect the gear "2" at the second transmission input shaft 4b.

After the motor vehicle has reached a predetermined first velocity, the internal combustion engine 2 is shifted from gear "1" to gear "2", thus the second clutch 5b is closed, while the first clutch 5a is opened simultaneously.

REFERENCE NUMERALS AND DESIGNATIONS

1 hybrid drive train
2 internal combustion engine
3 electric motor
4a first transmission input shaft
4b second transmission input shaft
5a first clutch
5b second clutch
6 drive shaft
7a transmission gear
7b transmission gear
8 synchronization device
9 transmission output shaft
10 gear
11 torque transferred by first clutch
12 speed of internal combustion engine
13 torque of electric motor
14 torque of transmission output shaft
15 torque of internal combustion engine
16 speed of second transmission input shaft
17 speed of first transmission input shaft

What is claimed is:

1. A method for operating a hybrid drive train for a motor vehicle, wherein the hybrid drive train comprises an internal combustion engine and an electric motor as drive units, and wherein a parallel variable speed transmission is disposed in the hybrid drive train, comprising: a first transmission input shaft, a second transmission input shaft and a transmission output shaft, wherein the first transmission input shaft can be coupled to the transmission output shaft through at least one first gear, and the second transmission input shaft can be coupled to the transmission output shaft through at least two second gears, wherein the internal combustion engine can be brought into operative engagement with the first transmission input shaft through a first clutch and can be brought into operative engagement with the second transmission input shaft through a second clutch, and wherein the electric motor is in driving engagement with the second transmission input shaft, wherein a first gear is shifted and torque is transferred from the internal combustion engine through the first clutch to the first transmission input shaft, wherein a first second gear is shifted with the second clutch open and torque is transferred by the electrical motor through the first transmission input shaft and through the first second gear to the transmission output shaft, wherein clutch slippage is created at the first clutch by reducing the torque transferred by the first clutch, while the torque provided by the electric motor is increased, wherein subsequently the torque provided by the electric motor is substantially reduced to zero and a second gear is shifted, while the slippage at the first clutch is reduced by increasing the torque transferred by the first clutch, and wherein torque is subsequently transferred from the electrical motor through the first transmission input shaft and through the second second gear to the transmission output shaft.

2. A method for operating a hybrid drive train for a motor vehicle, wherein the hybrid drive train comprises an internal combustion engine and an electric motor as drive units, and wherein a parallel variable speed transmission with a first transmission input shaft, a second transmission input shaft and a transmission output shaft is disposed in the hybrid drive train, wherein the first transmission input shaft can be coupled to the transmission output shaft through at least one first gear and the second transmission input shaft can be coupled to the transmission output shaft through at least one second gear, wherein the combustion engine can be brought into operative engagement with the first transmission input shaft through a first clutch and can be brought into operative engagement with the second transmission input shaft through a second clutch, and wherein the electric motor is in driving engagement with the second transmission input shaft, wherein a first gear is shifted and a torque is transferred from the internal combustion engine through the first clutch to the first transmission input shaft, wherein a torque is transferred from the electric motor through the second transmission input shaft, the second clutch and the first clutch, to the first transmission input shaft with at least one second gear in neutral position, wherein clutch slippage is established at the first clutch by increasing the torque provided by the electric motor, wherein the slippage at the first clutch is subsequently reduced by reducing the torque provided by the electric motor, the second clutch is opened and a second gear is shifted, and wherein torque is transferred from the electric motor through the first transmission input shaft and through the second gear to the transmission output shaft.

3. A method according to claim 2, wherein the torque of the electric motor is adapted to the clutch slippage of the first clutch, so that the torque transferred through the first clutch remains approximately constant while establishing the clutch slippage.

4. A method according to claim 2, wherein the slippage of the first clutch is reduced, so that the torque transmitted to the transmission output shaft remains approximately constant from the beginning of the reduction of the torque generated by the electric motor until the end of the closing of the second clutch.

* * * * *